United States Patent [19]

Stedt et al.

[11] Patent Number: 5,478,176
[45] Date of Patent: Dec. 26, 1995

[54] DRILL HAVING HELICAL FLUTE FOR DISCHARGING CUTTING FLUID

[75] Inventors: Robert Stedt, Fagersta; Ronny Karlsson, Valdermarsvik, both of Sweden

[73] Assignee: Seco Tools AB, Fagersta, Sweden

[21] Appl. No.: 305,728

[22] Filed: Sep. 14, 1994

[30] Foreign Application Priority Data

Sep. 14, 1993 [SE] Sweden .................................. 9302971

[51] Int. Cl.⁶ ............................ B23B 51/06; B23B 51/02
[52] U.S. Cl. ............................ 408/59; 408/229; 408/230
[58] Field of Search .................................. 408/227, 229, 408/230, 57, 59

[56] References Cited

U.S. PATENT DOCUMENTS 5,312,209  5/1994  Lindblom ................................. 408/230
5,350,261  9/1994  Takaya et al. ........................... 408/229

FOREIGN PATENT DOCUMENTS 3-142116  6/1991  Japan .
0142118  6/1991  Japan ..................................... 408/230
0142117  6/1991  Japan ..................................... 408/230

Primary Examiner—Steven C. Bishop
Attorney, Agent, or Firm—Burns, Doane, Swecker & Mathis

[57] ABSTRACT

A metal cutting drill includes a shank having cutting edges at a front end and helical flutes extending rearwardly from respective cutting edges for conductive cutting fluid away from the front end. The cross-sectional area of each flute, as seen in a plane oriented non-perpendicular to an axis of rotation of the drill, becomes progressively smaller in a rearward direction. A helix angle defined by each flute becomes progressively smaller in the rearward direction. An angle formed between the plane and another plane oriented perpendicular to the axis equals the helix angle at the location where the planes intersect each other and the axis.

11 Claims, 2 Drawing Sheets

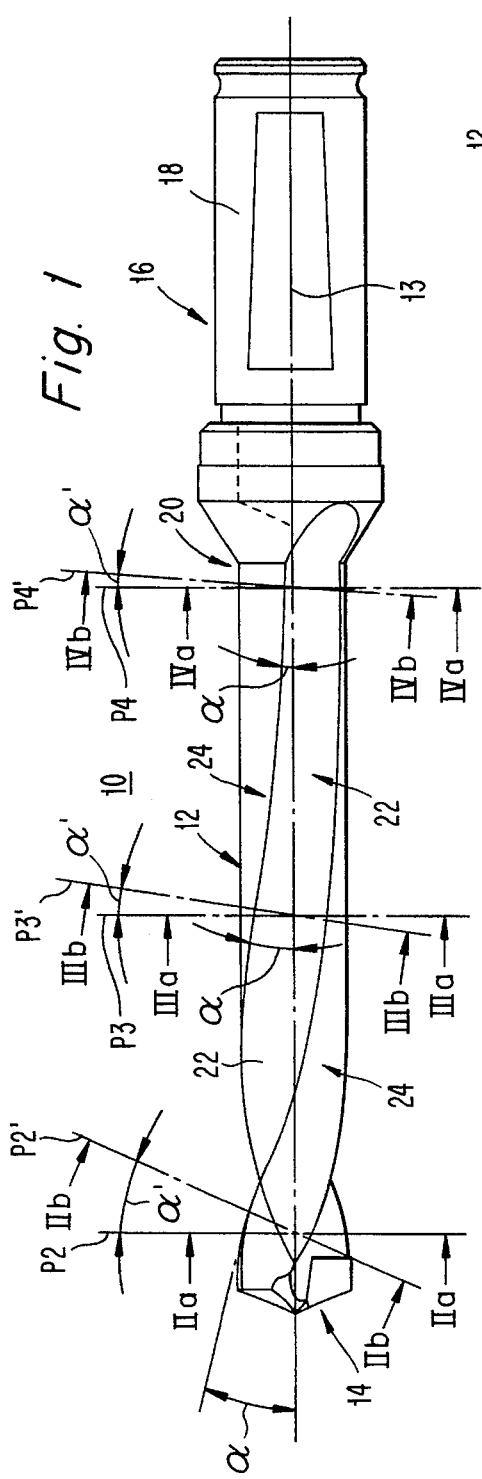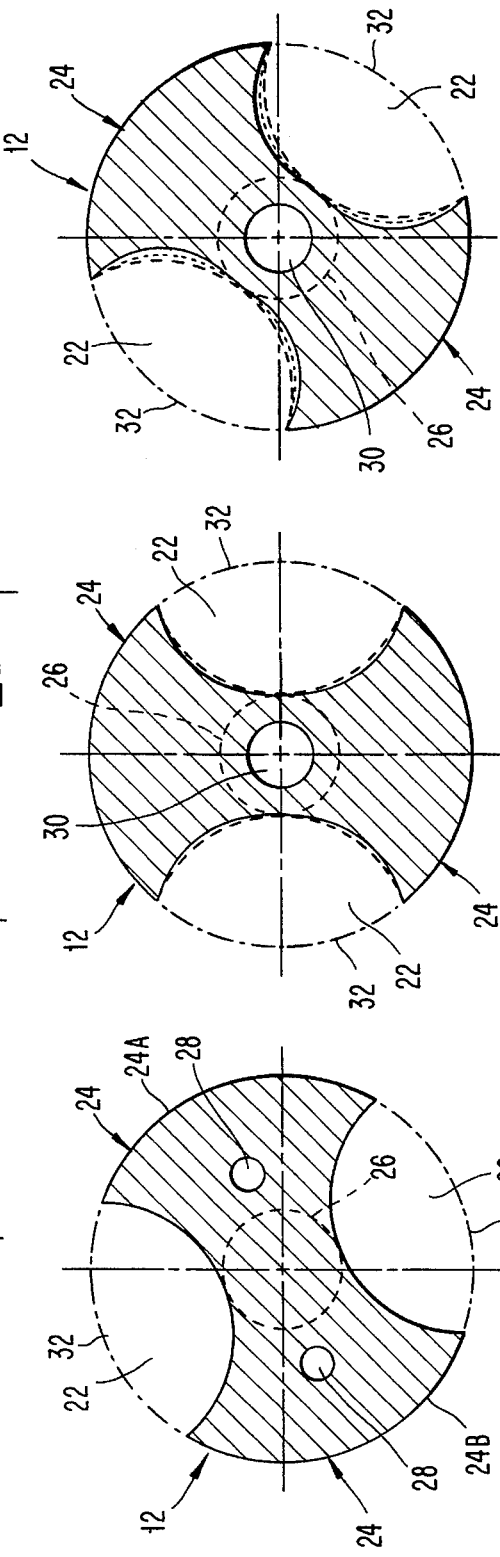

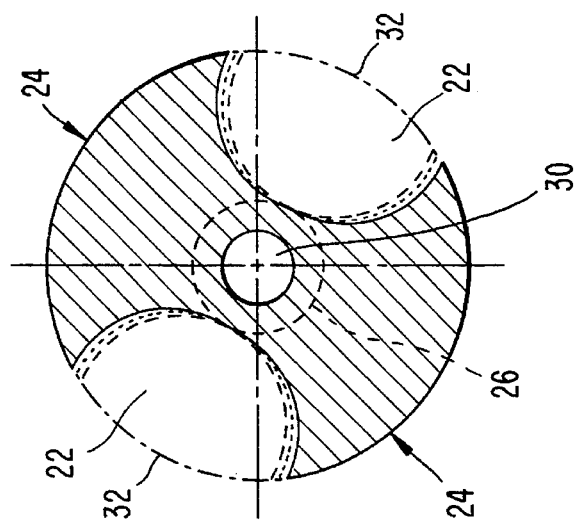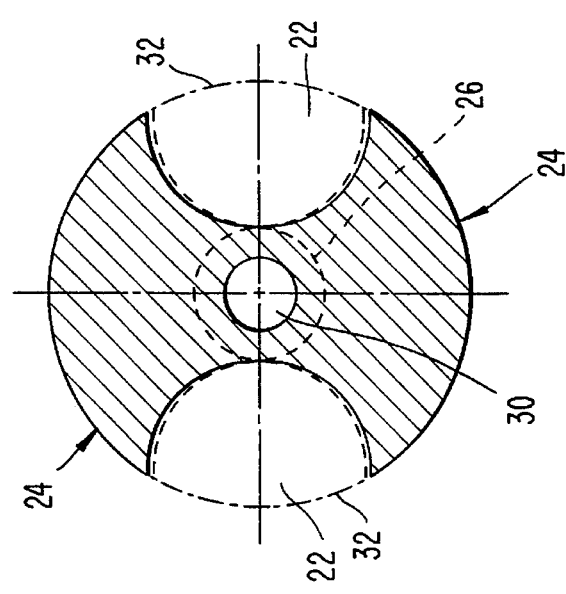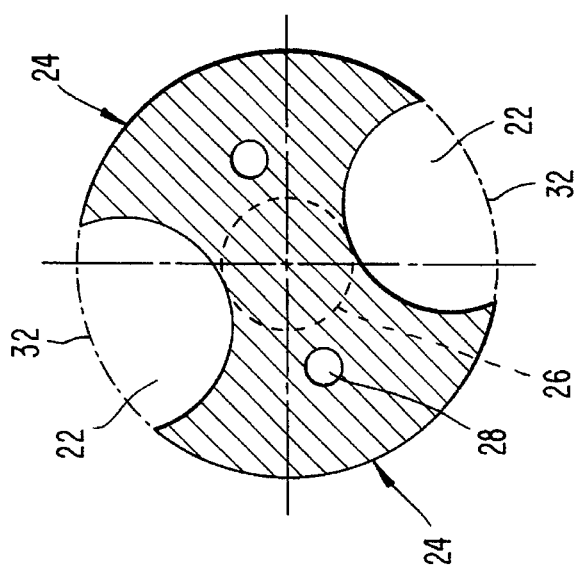

DRILL HAVING HELICAL FLUTE FOR DISCHARGING CUTTING FLUID

FIELD OF THE INVENTION

The present invention relates to a drill, preferably for metal cutting, including a shank having a front end including at least one cutting edge, a rear end and a number of flutes corresponding to the number of cutting edges, each flute extending from the front end to the rear end of the shank.

DESCRIPTION OF THE PRIOR ART

Drills of the type defined above are used for metal cutting and specifically for drilling holes in metallic workpieces. During the metal cutting operation chips are produced at the front (tip) end of the shank of the drill, the chips being formed and transported from the tip end of the shank of the drill to the rear end of the shank of the drill, the transport taking place in the flutes.

In order to improve the transport of chips in the flutes it is previously known from EP-A-0 549 548 to have an abrupt increase of the cross-sectional area of the portion of the helical flutes that transport the chips as compared to the portion of the helical flutes that forms the chips. However, such an increase of the cross-sectional area reduces the velocity of the cutting fluid that carries the chips and this will negatively affect the chip transport. Since material must be removed from the drill in order to increase the cross-sectional area of the flutes, the strength of the drill is reduced.

From Japanese Patent Document No. 3-142116, a drill is previously known having flutes with a cross-sectional area that increases in a direction away from the tip of the drill. However, the flutes have partially a helical shape and partially a straight shape. This design does not provide an optimum transport of the chips. Also the same reduction of strength as for European Document 0 549 548 applies here as well.

OBJECTS AND CHARACTERISTICS OF THE INVENTION

The aim of the present invention is to achieve an optimum transport of chips in a drill of the type defined above, the transport being effected by cutting fluid that travels in the flutes and carries the chips. A decreasing pumping effect of the flutes is balanced by a decrease of flute length. The aim of the invention is realized by a drill comprising a shank which defines a longitudinal axis of rotation. The shank includes a front tip end having at least one cutting edge, a rear end, an intermediate portion disposed between the front and rear ends, and at least one helical flute extending from the front end to the intermediate portion for conducting cutting fluid from the front end. The flute is configured to provide a gradually increasing volume from the front end to the intermediate portion. A non-fluted portion of the drill defines an outer periphery of the drill in the form of at least one segment of a circle as seen in a first plane oriented perpendicular to the axis. A circumferential dimension of the non-fluted periphery is substantially constant from the front end to the intermediate portion. The flute defines a helix angle which becomes progressively smaller from the first end to the intermediate portion.

Preferably, the cross-sectional area of the flute as seen in a second plane oriented at an acute angle relative to the first plane gradually increases from the front end to the intermediate portion. The acute angle is equal to the helix angle at a location where the first plane intersects the axis.

The flute has an opening at an outer periphery of the drill. That opening preferably becomes gradually wider from the front end to the intermediate portion as viewed in the second plane.

BRIEF DESCRIPTION OF THE DRAWINGS

Below, an embodiment of the invention will be described, reference being made to the accompanying drawings wherein:

FIG. 1 shows a side view of a drill according to the present invention;

FIG. 2a shows a section along lines IIa—IIa in FIG. 1;

FIG. 2b shows a section along line IIb—IIb in FIG. 1;

FIG. 3a shows a section along line IIIa—IIIa in FIG. 1;

FIG. 3b shows a section along line IIIb—IIIb in FIG. 1;

FIG. 4a shows a section along IVa—IVa in FIG. 1; and

FIG. 4b shows a section along line IVb—IVb in FIG. 1.

DETAILED DESCRIPTION OF A PREFERRED EMBODIMENT OF THE INVENTION

The drill 10 according to FIG. 1 includes a shank 12 having a longitudinal center axis 13. The shank 12 has further a front tip end 14 and an opposite rear end 16. Even if the described embodiment in the present application relates to a drill having a generally solid shank, the scope of the present invention also includes drills having pipe-formed (hollow) shanks. The expression "generally solid shanks" covers drills having shanks with holes for cutting/cooling fluid in otherwise solid shanks.

At the tip end 14 the shank 12 is equipped with two cutting edges that either can be brazed to the shank 12, or can be integral (one-piece) with the shank 12 or can be provided on indexable inserts secured to the shank 12.

The rear end 16 the shank 12 has a thick portion 18 suitable for insertion into a holder. From the first tip end 14 to an intermediate portion 20 (disposed between the front and rear ends) the shank 12 has a generally constant outer diameter.

In the disclosed embodiment two flutes 22 extend helically from the tip end 14 to the intermediate portion 20. When the flutes 22 are machined in the drill blank two lands 25 are created that also extend helically from the tip end 14 to the intermediate portion 20. In the circumferential direction of the shank 12 the lands 24 bridge the flutes 22.

In FIG. 1 it is also shown how the helix angle α gradually decreases from the tip end 14 to the intermediate portion 20. A typical value for the helix angle α in the region of the tip end 14 is 20° to 25° and a typical value for the helix angle α in the region of the intermediate portion 20 is 10° to 15°.

In FIGS. 2a–4a are shown cross-sections that lie in planes P2, P3, P4, respectively, extending perpendicular to the longitudinal center line 13 of the shank 12. The outer contour of the cross-sections is circular. As is clearly shown in FIGS. 2a–4a there is a web portion 26 in the middle of the shank 12, the web portion 26 having a substantially constant diameter between the tip end 14 and the intermediate portion 20. From the tip end 14 two branch coolant holes 28 extend rearwardly (i.e., towards the intermediate portion 20), while being inclined toward the center axis of the shank. The holes 28 merge into a center coolant hole 30 that extends rearwardly through the rest of the shank 12, i.e. the center coolant hole 30 penetrates the end wall of the thicker portion 18.

As can further be seen from FIGS. 2a–4a the land 24 (i.e., the non-fluted portion of the drill) forms an outer periphery in the form of two circular segments 24A, 24B, each of which having a substantially constant circumferential dimension in the cross-sections according to FIGS. 2a–4a, i.e. cross-sections lying in a plane perpendicular to the longitudinal center axis 13. Thus, the circumferential dimension of each segment 24A, 24B remains substantially unchanged in the rearward direction as viewed in those figures. Desirably, the cross-sectional area of the flutes would not change in a rearward direction as viewed in those figures, but due to tolerances in present machining methods, a slight increase in cross sectional area will result. In each of FIGS. 3a and 4a, the walls of the flutes in those figures are shown by solid lines. However, for comparison purposes in those figures, dashed and dotted lines are provided to show how the solid line flute walls differ in contour from other regions of the flutes. That is, in FIG. 3a dashed lines are provided to demonstrate how the shape of the flute contour in FIG. 2a differs from that of FIG. 3a. Likewise, in FIG. 4a, the dashed lines demonstrate how the shape of the flute contour in FIG. 2a differs from that of FIG. 4a, and the dotted lines demonstrate how the shape of the flute contour in FIG. 3a differs from that of FIG. 4a. By studying these lines of FIGS. 2a–4a it will be appreciated that the cross-sectional area of the flutes 22, i.e. the area defined by the walls of the flute 22 and the phantom line 32 (also called the open side) bridging the lands 24, increases slightly in the rearward direction. This increase is not appreciable, so the strength of the shank 12 remains basically constant between the tip end 14 and the intermediate portion 20.

Shown in FIGS. 2b–4b are cross-sections of the shank that lie in planes P2', P3', P4' forming an acute angle α' with respective ones of the planes P2, P3, P4 lying perpendicular to the longitudinal center axis 13. Thus the outer contour of the cross-sections of FIGS. 2b–4b is elliptical. The angle α' is equal to the helix angle α of the flutes 22 at the point where the planes intersect the longitudinal center axis 13. Thus, the planes P2', P3', P4' lying non-perpendicular to the axis are oriented substantially perpendicular to the flutes. As has been pointed out above, the helix angle α varies in the longitudinal direction of the shank 12.

As can be seen from FIGS. 2b–4b the cross-sectional area of the flutes 22, i.e. the area defined by the walls of the flute 22 and the imaginary phantom line 32 bridging the lands 24, increases in a direction from the tip end 14 to the intermediate portion 20. That is, of the three cross-sectional areas of the flutes shown in FIGS. 2b–4b, the cross-sectional area of the flute 22 shown in FIG. 2b is the smallest one, the cross-sectional area of the flute 22 in FIG. 3b is larger than the one in FIG. 2b but smaller than the one in FIG. 4b, and the cross-sectional area of the flute 22 in FIG. 4b is larger than each of the cross-sectional areas of the flute 22 in FIG. 2b and in FIG. 3b. The cross-sectional area of each flute 22 increases by 5%±2% (i.e. 3–7%) from the tip end to the intermediate portion 20.

In the same way as described above in connection with FIGS. 2a, 3a, 4a, dashed and doted lines are provided in FIGS. 2b–4b to compare flute contours. Thus, in FIG. 3b the contour of the flute 22 of FIG. 2 is indicated by dashed lines. In FIG. 4b the contour of the flute of FIG. 2b is indicated by dashed lines, and the contour of the flute 22 of FIG. 3b is indicated by dotted lines. Thus, there is a gradual increase, from the tip end 14 to the intermediate portion 20, of a cross-sectional area of the flutes 22 defined by planes forming an angle α' with a plane that is perpendicular to the longitudinal center axis 13, the angle α' corresponding to the helix angle α at the point where the planes intersect each other and the longitudinal center axis 13. Thus, the available volume for accommodating cutting fluid traveling in the flutes increases gradually from the tip end 14 to the intermediate portion 20. By such a design, there will occur no jamming problems in connection with the cutting fluid and chips when traveling from the tip end 14 to the intermediate portion 20. At the same time, the strength of the shaft 12 is in principle the same between the end tip 14 and the intermediate portion 20.

From FIGS. 2b–4b it will be appreciated that the increase in cross-sectional area of the flutes 22 as seen in planes P2', P3', P4' is achieved through a widening of the open side 32 of the flutes 22.

However, within the scope of the present invention it is also possible to increase the cross-sectional area of the flutes 22 by decreasing the diameter of the web portion 26. In such a case it is necessary to decrease the area of the center coolant hole 30 in order to maintain a proper strength of the drill 10. Thus, the depth of the flutes 22 is determined by a compromise between the requirement of strength in the shank 12 on the one hand and the desire of spacious flutes 22 on the other hand.

The drill 10 according to the present invention functions in the following way.

The cutting edges of the tip end 14 provide a chip removing machining of a workpiece to create a hole. The removed chips are then forced into the flutes 22 where they are formed into a curled shape. During drilling, cutting fluid is fed to the tip end 14 via the center coolant hole 30 and the branch coolant holes 28. The cutting fluid fed to the tip end 14 is then discharged from the tip end 14 to the intermediate portion 20 via the helical flutes 22. The discharged fluid carries the removed chips towards the intermediate portion 20 of the shank 12. When the cutting fluid discharges from the drilled hole the chips are assembled on the workpiece around the hole.

If the size of the helix angle α were constant instead of being gradually reduced, the fact that the cross-sectional area of the flutes 22, as seen in FIGS. 2b–4b, increases rearwardly from the tip end 14 towards the intermediate portion 20, would result in a decreasing velocity of the cutting fluid in the rearward direction. Consequently, the cutting fluid and the chips would perform a jamming action during travel from the tip end 14 to the intermediate portion 20.

However, in accordance with the present invention, the size of the helix angle α decreases in the rearward direction, whereby the overall distance which the fluid must travel is reduced. Consequently, any tendency for the fluid velocity to be reduced by the increased cross section will be compensated for by the tendency for the fluid velocity to be increased by the shortened travel distance. Thus, as the pumping effect of the flutes decreases with the increase in flute volume, the continuous decreasing of the helix angle will balance that pumping effect. In sum, the gradually increasing cross sectional area of the flutes (see FIGS. 2b–4b) minimizes jamming of chips, and there is no appreciable reduction in flow velocity which would cancel-out such anti-jamming effect. Furthermore, this advantage is achieved without any appreciable reduction in the strength of the drill.

Although the present invention has been described in connection with a preferred embodiment of the invention, it will be appreciated by those skilled in the art that additions, modifications, substitutions and deletions not specifically described may be made without departing from the spirit and scope of the invention as defined in the appended claims.

What is claimed:

1. A drill comprising a shank defining a longitudinal axis of rotation, said shank including a front tip end having at least one cutting edge, a rear end, an intermediate portion disposed between said front and rear ends and at least one helical flute extending from said front end to said intermediate portion for conducting cutting fluid from said front end, said flute configured to provide a gradually increasing volume from said front end to said intermediate portion, a non-fluted portion of said drill defines an outer periphery of said drill in the form of at least one segment of a circle as seen in a plane oriented perpendicular to said axis, a circumferential dimension of said non-fluted outer periphery being substantially constant from said front end to said intermediate portion, said flute defining a helix angle which becomes progressively smaller from said front end to said intermediate portion.

2. The drill according to claim 1, wherein said at least one cutting edge comprises two cutting edges, said at least one flute comprising two flutes spaced diametrically apart from one another.

3. The drill according to claim 1, wherein said plane constitutes a first plane, the cross-sectional area of said flute as seen in a second plane oriented at an acute angle relative to said first plane progressively increasing from said front end to said intermediate portion, said acute angle being equal to said helix angle at a location where said first plane intersects said axis.

4. The drill according to claim 3, wherein said flute has an opening at an outer periphery of said drill, said opening becoming progressively larger from said front end to said intermediate portion as viewed in said second plane.

5. The drill according to claim 1, wherein said shank has a generally constant outer diameter from said front end to said intermediate portion.

6. The drill according to claim 1, wherein said helix angle at said front end is from 20° to 25°.

7. The drill according to claim 5, wherein said helix angle at said intermediate portion is from 10° to 15°.

8. The drill according to claim 1, wherein said helix angle at said intermediate portion is from 10° to 15°.

9. The drill according to claim 1, wherein said cross sectional area of said flute at said intermediate portion is from 3 to 7% greater than at said front end.

10. The drill according to claim 1 including a passage extending through said shank and opening at said front end for conducting cutting fluid thereto.

11. The drill according to claim 1, wherein said intermediate portion includes a tapered section, said shank including a cylindrical portion extending forwardly from said tapered section to said front tip end, said helical flute extending from said front tip end to said tapered section.

* * * * *